United States Patent [19]

Sladky

[11] Patent Number: 4,540,016

[45] Date of Patent: Sep. 10, 1985

[54] FLOW-CONTROL SYSTEM WITH PRESSURE-RESPONSIVE VALVE

[76] Inventor: Hans H. Sladky, Fabriciusstrasse 16, 2000 Hamburg 71, Fed. Rep. of Germany

[21] Appl. No.: 403,707

[22] Filed: Jul. 30, 1982

[51] Int. Cl.³ .................... B08B 9/00; F16K 31/34
[52] U.S. Cl. ......................... 137/244; 137/426; 137/445; 137/494; 137/505.13; 137/505.22; 137/505.28; 137/625.33; 137/413
[58] Field of Search ............... 137/244, 315, 413, 414, 137/415, 426, 434, 445, 505.27, 505.28, 505.13, 505.22, 625.33, 494, 454.2; 251/360

[56] References Cited

U.S. PATENT DOCUMENTS

| | | | |
|---|---|---|---|
| 967,845 | 8/1910 | Siegrist | 137/413 |
| 1,354,311 | 9/1920 | Landrum | 137/445 |
| 1,606,803 | 11/1926 | Lalor | 137/505.28 |
| 2,558,471 | 6/1951 | Whitlock | 137/445 |
| 2,619,777 | 12/1952 | La Point | 137/494 |
| 2,640,498 | 6/1953 | Bissell | 137/625.33 |
| 2,735,442 | 2/1956 | Kenney | 137/413 |
| 2,827,260 | 3/1958 | Jordan | 137/625.33 |
| 3,159,177 | 12/1964 | Hott, Jr. | 137/494 |
| 3,410,304 | 11/1968 | Paul, Jr. | 137/494 |
| 3,587,627 | 6/1971 | Gilmore | 137/445 |

FOREIGN PATENT DOCUMENTS 0495248  1/1978  Australia .................. 137/625.3

*Primary Examiner*—George L. Walton
*Attorney, Agent, or Firm*—Karl F. Ross; Herbert Dubno

[57] ABSTRACT

A system for maintaining a predetermined average liquid level in a pool comprises a pilot valve responsive to a float in the pool and a main valve controlled by the pilot valve to unblock a normally blocked supply conduit when the liquid in the pool drops below that level. The pilot valve, when opened by the float, lets incoming liquid under pressure—branched off the supply conduit at a point upstream of the main valve—enter a compartment under a membrane in the body of the main valve, that membrane carrying a control rod connected with a movable plate which coacts with a stationary plate obstructing the supply conduit inside the valve body; the two plates have apertures which are normally offset from each other but register upon pressurization of the membrane to give passage to the incoming liquid. The control rod passes with small annular clearance through a calibrated bushing in a bore communicating with the compartment under the membrane, that clearance forming a bleeder hole through which pressure liquid in that compartment can leak off to the downstream side of the supply conduit at least as long as the movable plate is in its unblocking position. The pilot valve may be provided with a similar pair of relatively slidable plates and a control rod which is coupled with a float-supporting lever by a double-jointed link.

12 Claims, 6 Drawing Figures

FLOW-CONTROL SYSTEM WITH PRESSURE-RESPONSIVE VALVE

FIELD OF THE INVENTION

My present invention relates to a flow-control system in which a valve normally blocking the passage of a fluid is movable into an unblocking position in response to changes in pressure or in some other parameter of the controlled or possibly another fluid.

BACKGROUND OF THE INVENTION

The art today knows fluid-regulating valves which can be shifted by small pneumatic, hydraulic or mechanical forces acting upon a shutter mechanism, thanks to the use of two relatively slidable plates with multiple apertures—usually designed as slits—that are mutually offset in a blocking position and are mutually aligned in an unblocking position. These sensitive valves, therefore, can be used either for direct flow regulation or as pilot valves for the control of associated flow-regulating valves. The precise design of their operating elements, however, makes them susceptible to various factors which may impair their function, among them possible blockages of fluid passages and inaccurate guidance of connecting members. When, for example, the valve body or housing includes a compartment bounded by a membrane or other resiliently biased member displaceable by fluid under pressure, that compartment ought to have a calibrated bleeding hole whose cross-sectional area determines the pressure required for opening or closing the valve. Such a bleeding hole is usually of rather small diameter and is therefore liable to become clogged by impurities or, if the controlling fluid is a hardenable liquid, by a residue of that liquid when the influx thereof has ceased.

In the case of a pilot valve controlled by a float measuring the level of a liquid, e.g. in a pool intermittently fed with fresh liquid by way of that valve, the movement of that float is nonlinear when its support consists of a lever fulcrumed on the valve housing. The translation of the swing of that lever into a linear motion of a sliding shutter also creates problems which heretofore have made it difficult to utilize valves of the aforementioned sensitive type for this purpose.

OBJECTS OF THE INVENTION

The general object of my present invention, therefore, is to provide a highly effective valve for pilot or flow-regulating purposes.

A more particular object is to provide means in a flow-regulating valve for preventing possible clogging of a bleeding hole communicating with a pressure compartment.

Another specific object of my invention is to provide means in a float-controlled valve for connecting a lever with a sliding shutter in a manner opbviating the generation of undesirable force components.

SUMMARY OF THE INVENTION

According to one aspect of my invention, a channel interconnecting an entrance port and an exit port in the body of a flow-regulating valve includes flow-control means movable between a blocking and an unblocking position with the aid of a rod extending to a resiliently biased member bounding a pressure compartment communicating with a control port. The biased member, advantageously designed as a spring-loaded membrane, is repressible against its biasing force by fluid under pressure admitted via the control port into the compartment adjoining this member. That compartment communicates with the blockable channel, downstream of the flow-control means, by way of a restricted passage which is traversed with limited clearance by the connecting rod so as to enable a throttled escape of fluid from the pressure compartment to the exit port. Thanks to the motion imparted to the connecting rod by the resiliently biased member during opening and closure of the valve, any foreign matter tending to clog the small clearance will be dislodged so that pressure fluid can escape at a predetermined rate in the unblocking position of the shutter means.

When the tendency to clog is particularly high, as where the fluid to be controlled is a hardenable liquid, it may be desirable to obstruct that clearance in the blocking position so that pressure sufficient to open the valve may be built up rapidly in the compartment bounded by the membrane or other resiliently biased member. In such a case I prefer to provide the connecting rod with a plug sealing off that clearance under the biasing force in the absence of countervailing fluid pressure, the plug advantageously coming to rest on an end of a calibrated bushing spacedly surrounding the rod to define the aforementioned clearance.

In a reversal of the arrangement referred to, the pressure compartment communicates with the blockable channel on the upstream side of the flow-control means from which fluid enters that compartment in both shutter positions through the restricted passage surrounding the connecting rod. As long as the compartment is vented through the control port, the valve stays open; when the outflow through that port is cut off, e.g. through an ancillary valve, the connecting rod is shifted into the blocking position.

According to another aspect of my invention, applicable to a float-controlled valve, a shutter horizontally slidable in the valve housing is coupled by a double-jointed link with a float-supporting lever fulcrumed on that housing. Such a link transmits only the horizontal component of the lever motion without generating any significant bending stresses in the shutter mechanism. The lever is preferably elbow-shaped with a substantially vertical arm articulated to the double-jointed link and a substantially horizontal arm rigidly connected with the float.

BRIEF DESCRIPTION OF THE DRAWING

The above and other features of my invention will now be described in detail with reference to the accompanying drawing in which.

SPECIFIC DESCRIPTION

Figure 1:
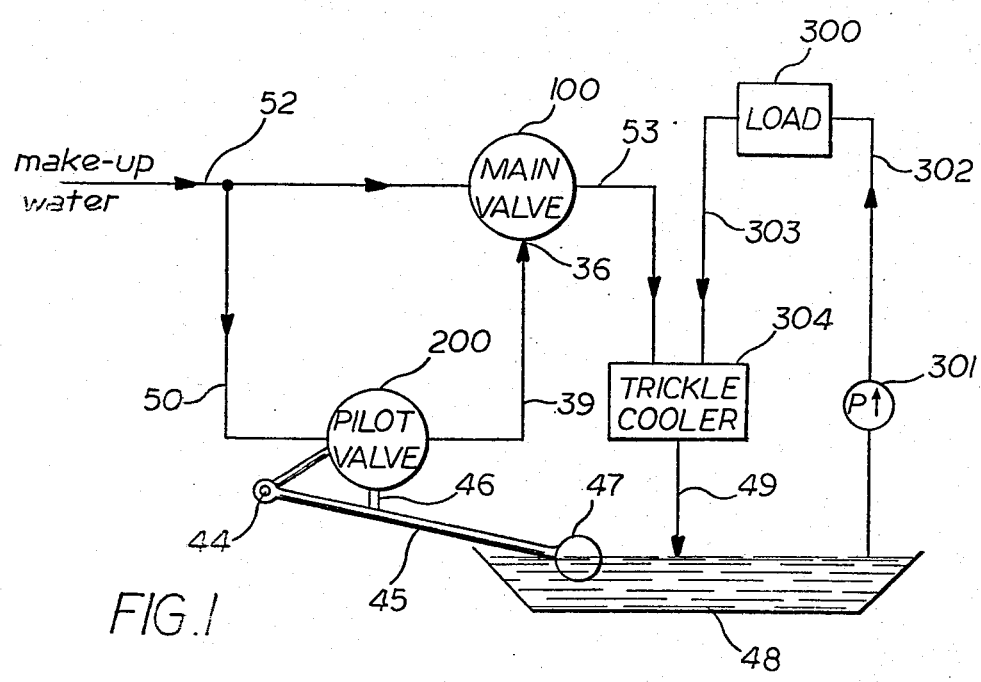
FIG. 1 is a diagrammatic view of a flow-control system according to my invention, including a main flow-regulating valve and an associated pilot valve.

In FIG. 1, by way of example, I have shown a main valve 100 and a pilot valve 200 included in a system designed to supply water at near-freezing temperature to a load 300, the water being circulated to the load by a pump 301 via an ascending conduit 302, a descending conduit 303 and a trickle cooler 304 through which the recirculated water—heated in the load to, say, 20° C.—is fed back via a pipe 49 to a pool in a tank 48 where the average water temperature is to be slightly above 0° C. Since water is unavoidably lost during circulation, make-up water must be supplied from time to time via a conduit 52 in order to maintain the liquid in the pool at a predetermined average level. A float 47 dipping into the liquid in tank 48 is supported by a lever 45 which has an extension 46 controlling the pilot valve 200 as more fully described hereinafter with reference to FIG. 5. The lever is swingable about a horizontal pivot axis at a fulcrum 44 on the housing of the valve 200. A branch 50 of conduit 52 enters ancillary valve 200 from which an extension 39 of that branch leads to a control inlet 36 of main valve 100.

As long as the liquid level in tank 48 is high enough, both valves 100 and 200 are closed. When the water drops below the designated level, float 47 causes lever 45 to open the pilot valve 200 whereby incoming water at supply pressure reaches the control inlet 36 of valve 100; the latter thereupon unblocks the connection between conduits 52 and 53 to feed make-up water by way of trickle cooler 304 to the pool in tank 48 unitl the flow through pilot valve 200 is cut off by the float 47. As will be readily apparent, the delay caused by the passage of the make-up water through trickle cooler 304 introduces a certain hysteresis in the operation of the system. Thus, water will continue to accumulate for a while in reservoir 48 after the reclosure of both valves and a certain time will elapse until they have to be opened again.

Figure 2:
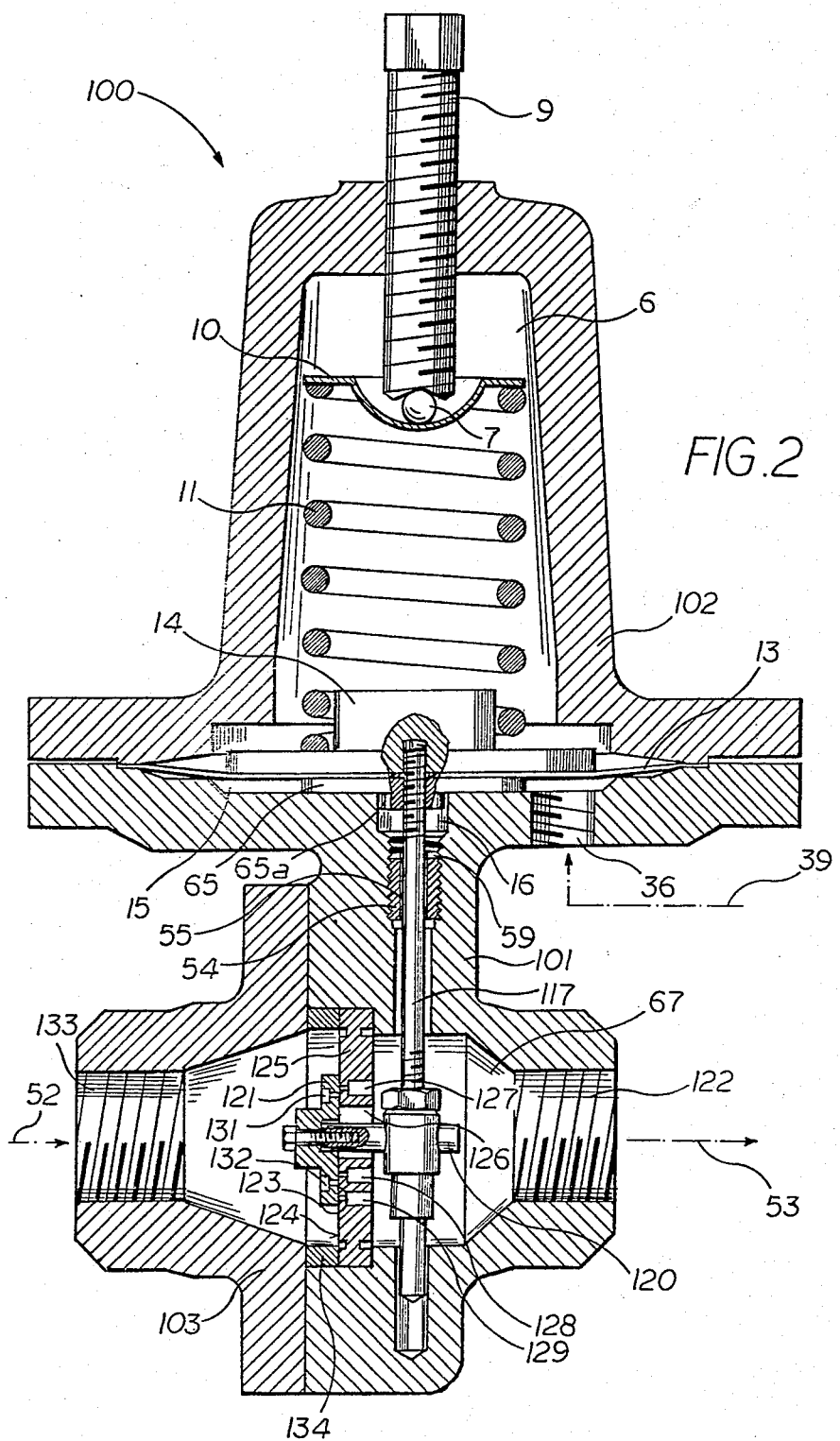
FIG. 2 is a longitudinal sectional view of the main valve of FIG. 1, shown in a flow-blocking position and drawn to a larger scale.

Reference will now be made to FIG. 2 showing details of the structure of flow-regulating valve 100. This valve comprises a housing formed from a lower body 101 and an upper body 102 as well as a cover 103 whose flange is bolted to body 101 and which forms an entrance port 133 connected to the supply line 52. An exit port 122, formed by body 101 and connected to outgoing line 53, is coaxial with port 122 and is separated therefrom by a shutter assembly including a sliding plate 121 and a fixed plate 125, the plate 125 extending completely across a channel 67 existing between ports 122 and 133. Plate 125, clamped between body 101 and cover 103 by a spacing ring 134, has a contact surface 124 confronting the slide 121 and is provided with three slits 127, 128, 129 extending parallel to one another in a direction perpendicular to the plane of FIG. 2. Surface 124 of plate 125 is in contact with a surface 123 of slide 121, that slide having two slits 131, 132 which in the valve-open position of FIG. 3 respectively register with slits 127 and 128. The third slit 129 of plate 125 is unobstructed in this position but will be closed by a slight downward shift of slide 121 which also disaligns the reduced extremities of slits 131 and 132 from those of slits 127 and 128; upon such disalignment, as shown in FIG. 2, the flow path from port 133 to port 122 is completely blocked.

Slide 121 is secured to a pin 120 which traverses a guide slot 126 of plate 125 and is fastened to the lower end of a connecting rod 117 whose upper end is threaded into a disk 14 overlying a flexible membrane 13 clamped between housing parts 101 and 102. Disk 14 serves as an anchor for a coil spring 11 which is received in a chamber 6 formed by a dome-shaped portion of body 102; another spring anchor is formed by a dished plate 10 abutting an adjusting screw 9 which is threaded into the top wall of chamber 6 and bears upon the plate 10 through a ball 7.

Membrane 13 defines with body 101 a pressure compartment 15 of variable volume opening into a threaded vertical bore 16 as well as into the control inlet 36 already referred to. A smaller disk 65, secured to the underside of the membrane opposite spring anchor 14, has a neck 65a received with clearance in the upper part of bore 16. Seated in this bore is a threaded bushing 54 which is calibrated to surround the rod 117 with a small annular clearance 55 serving as a bleeder aperture for compartment 15 whereby pressure fluid admitted via inlet 36 into that compartment can leak off into exit port 122 through a part of channel 67 downstream of shutter assembly 121–125. Bushing 54 has notches 59 facilitating its screwing into the threaded bore 16.

As long as no fluid under pressure is delivered to inlet 36 through the bypass line 39 controlled by pilot valve 200, as shown in FIG. 1, the pressure of spring 11 acting upon membrane 13 holds the valve 100 in the closed position illustrated in FIG. 2. If any solids should accumulate in clearance 55 during such closure, they will be quickly dislodged when the reapplication of pressure to compartment 15 raises the membrane and elevates the connecting rod 117 along with slide 121 to re-establish communication between ports 133 and 122. As further shown in FIG. 3, where conduit 39 is seen to be branched off the supply line 52 at a lateral aperture 68, the float-controlled pilot valve 200 of FIG. 1 could be replaced in some instances by a different flow controller 200', e.g. a manually operated shut-off valve.

Figure 3:
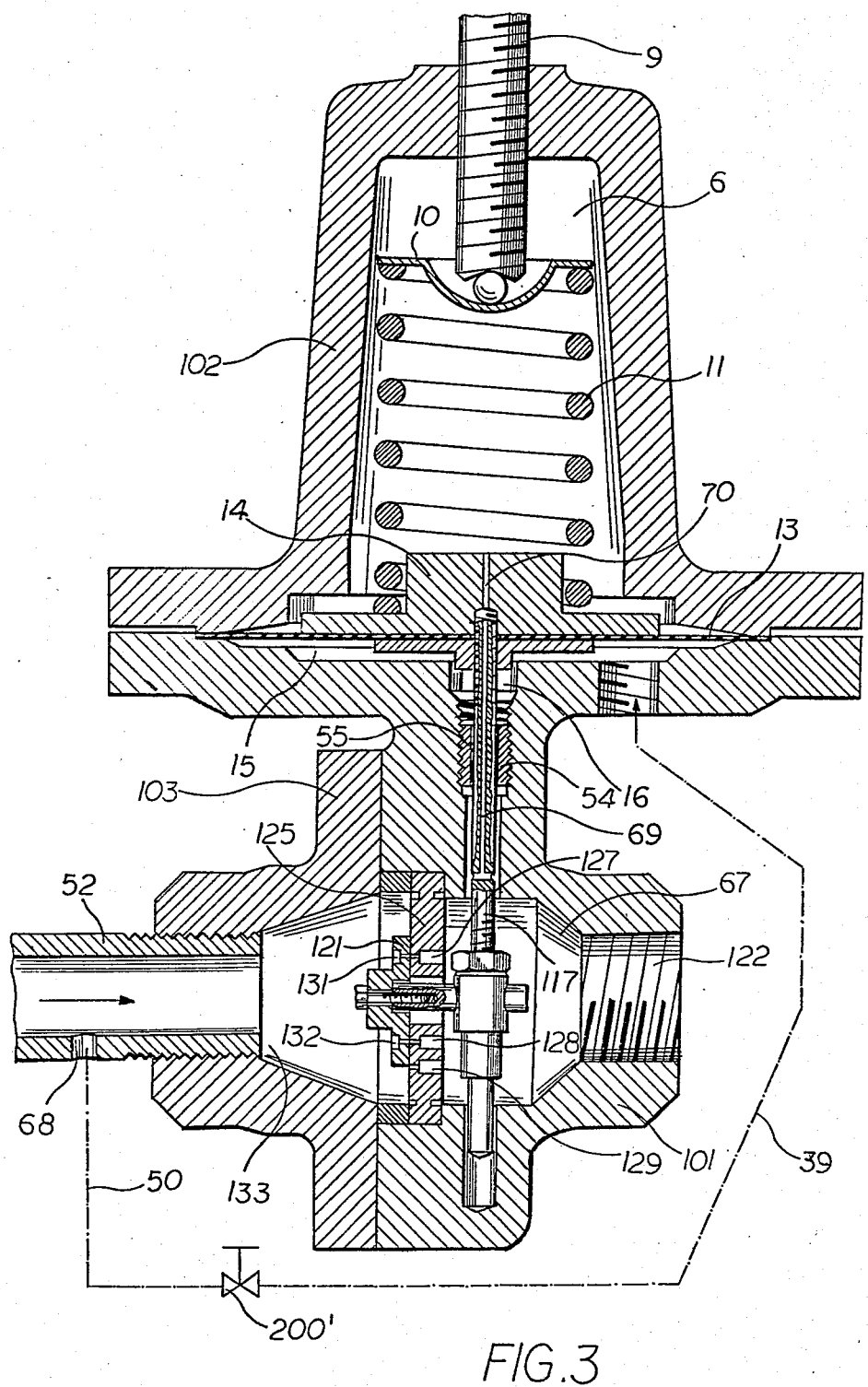
FIG. 3 is a sectional view of part of the valve of FIG. 2 in an unblocking position, showing a modification.

FIG. 3 further shows a bore 69 passing axially through connecting rod 117 and opening at its lower end into the channel 67, the upper end of bore 69 communicating via a bore 70 in disk 14 with the spring chamber 6. Such a connection between chamber 6 and exit port 122 serves to maintain outlet pressure in that chamber when the latter is not otherwise vented to the atmosphere.

Figure 4:
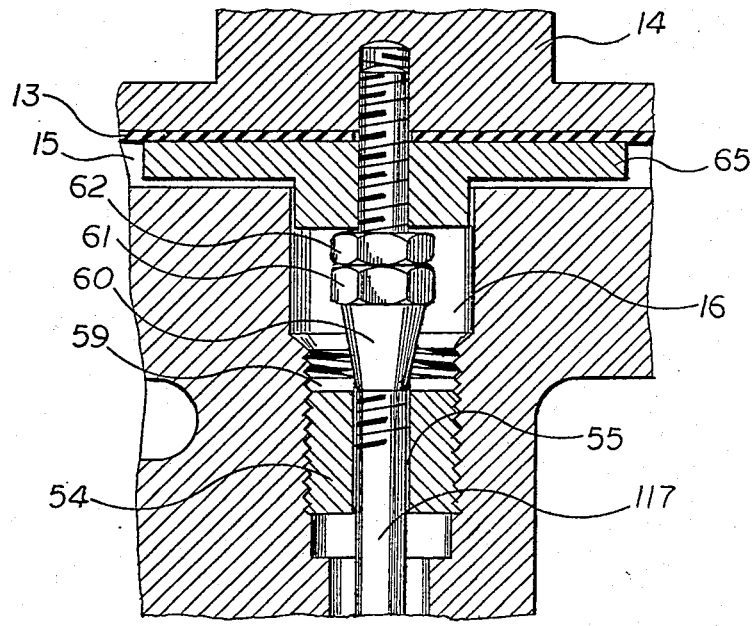
FIG. 4 is a view similar to that of FIG. 2, illustrating another modification.

In FIG. 4 I have shown the connecting rod 117 provided with a frustoconical plug 60 having a head 61 engaged by a locking nut 62. In this instance, the closure or blocking position of the valve is determined by the plug 60 coming to rest on the slightly flared upper end of bushing 54 whereas disk 65 underlying the membrane 13 remains spaced above the bottom of compartment 15, unlike the arrangement of the preceding Figures where the disk abuts that bottom in the closure position (see FIG. 2). As a result, pressure fluid entering the compartment 15 through inlet 36 (FIGS. 2 and 3) will be able to act upon the entire underside of membrane 13 while still being prevented from escaping through clearance 55 as long as the valve is closed. There is thus available a larger force to overcome the inertia of the mobile masses and the initial frictional resistance between sliding surfaces 123 and 124 of plates 121 and 125 which is relatively high at this stage since the full supply pressure of the fluid in conduit 52 bears upon the shutter assembly. Some resistance may also be encountered by the rod 117 within bushing 54, especially in the case of a nonaqueous working liquid liable to leave a hardened residue in clearance 55. As soon as the membrane 13 beings to lift, such resistance will be broken and clearance 55 will again communicate with compartment 15 to establish an escape path for the pressure fluid in that compartment; at the same time the friction between plates 121 and 125 will be reduced as the pressure at entrance port 133 is relieved by the opening of the shutter.

Figure 5:
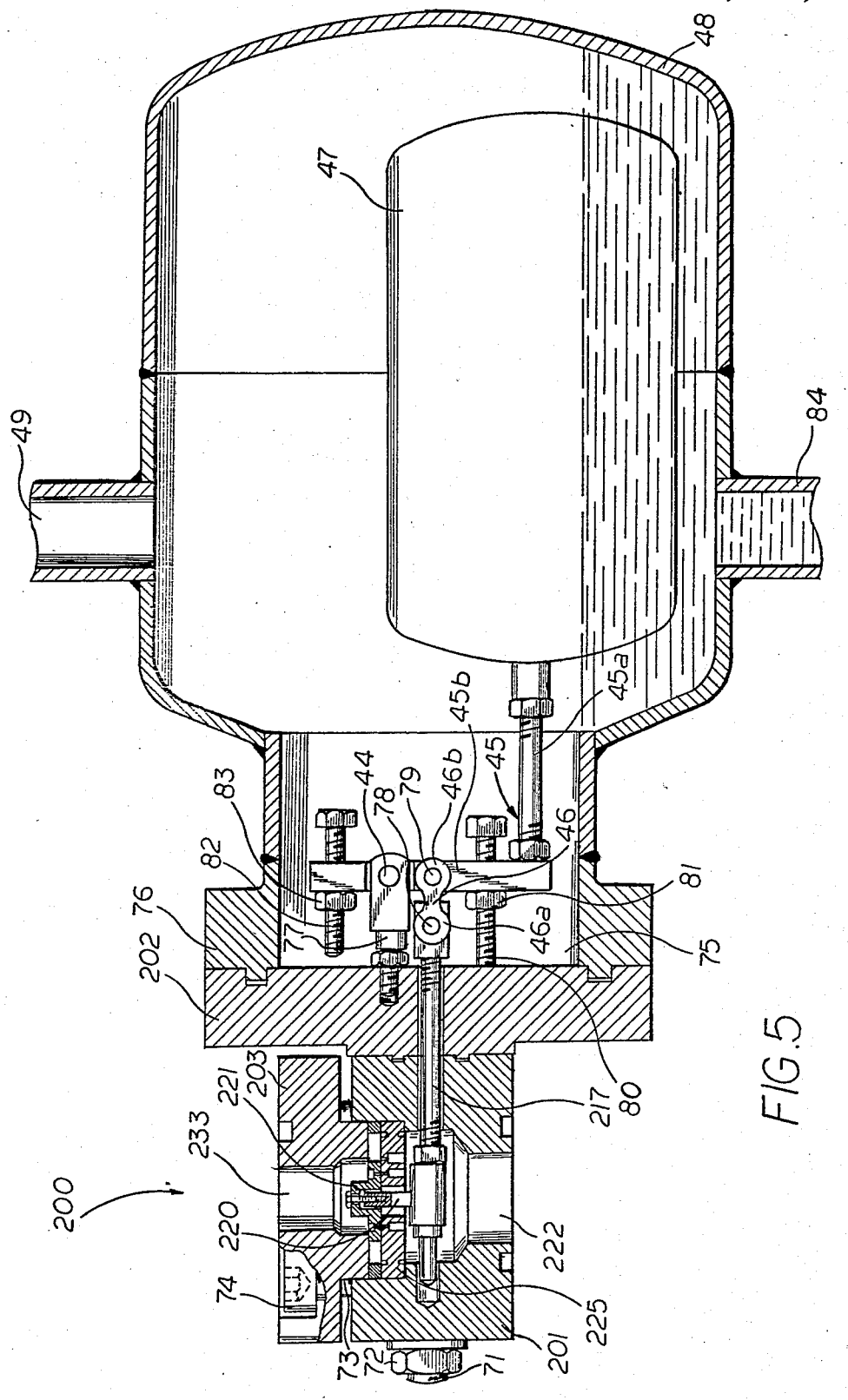
FIG. 5 is a sectional view, also drawn to a larger scale, of the pilot valve of FIG. 1 and an associated float.

I shall now refer to FIG. 5 for a more detailed description of the pilot valve 200 shown in FIG. 1. That valve has a structure generally similar to that of flow-regulating valve 100, with its housing comprising two parts 201, 202 as well as a cover 203 forming an inlet port 233 opposite an outlet port 222; unlike bodies 101 and 102, hoqwever, parts 201 and 202 adjoin each other along a vertical surface. A shutter assembly between ports 222, 233 comprises again a stationary plate 225 adjoining a movable plate 221, the two plates being apertured in the same manner as plates 121 and 125 of FIGS. 2 and 3. Slide 221 is secured to a pin 220 which traverses a guide slot of plate 225 and is fastened to a connecting rod 217 extending into housing part 202. The two housing parts 201 and 202 are interconnected by bolts 71 and nuts 72; cover 203 is secured to body 201 by bolts 73 with heads 74.

Rod 217, which together with pin 220 and plate 221 slides horizontally rather than vertically as do their counterparts in valve 100, extends into a chamber 75 surrounded by a flange 76 of a tank 48 which corresponds to the reservoir so designated in FIG. 1. The pool of liquid in that tank supports the aforedescribed float 47 which is rigid with a horizontal arm 45a of its supporting lever 45, the latter being elbow-shaped and provided with a vertical arm 45b which is swingable within chamber 75 about a horizontal pivot pin constituting the fulcrum 44 and spanning a bifurcate extremity of a bolt 77 screwed into housing part 202. The lever extension 46 schematically indicated in FIG. 1 is here shown as a double-jointed link with two eyes 46a, 46b respectively articulated to rod 217 and arm 45b by pintles 78, 79. Link 46 lies substantially in line with rod 217, its pivot 79 being close to the fulcrum 44 of lever 45 so as to require a significant rise or fall of float 47 in order to shift the shutter plate 221 from its illustrated unblocking position into its blocking position or vice versa. The swing of lever 45, and thus the shift of slide 221, is limited by a pair of abutments, namely a bolt 80 threaded into a lower part of arm 45b while being secured in position by a nut 81 and a bolt 82 threaded into the free end of arm 45b where it is held in position by a nut 83. In the illustrated unblocking position of valve 200, brought about by a low liquid level in tank 48, bolt 80 bears upon the outer surface of housing part 202 to prevent any further clockwise swing of lever 45. When the water level rises, the lever swings counterclockwise until bolt 82 abuts the same housing wall to establish the blocking position of the valve. FIG. 5 also shows the pipe 49, through which water from trickle cooler 304 (FIG. 1) is fed into tank 48, as well as a drain 84 through which the tank can be emptied or placed in communication with a larger body of water.

It will be noted that the effective length of link 46—measured between pintles 78 and 79—is many times greater than the stroke of rod 217 limited by stops 80 and 82. This link, therefore, remains substantially horizontal in both limiting positions so as to move virtually codirectionally with the rod. Thus, no significant bending or shear stresses are imparted to rod 217 or to the shutter mechanism controlled thereby. The link 46 could be modified in various ways, as by providing it with spherically curved extremities forming part of a pair of universal joints to replace the hinges constituted by eyes 46a, 46b and pintles 78, 79.

In any event, the point of articulation of lever 45 with link 46 could also be located at the opposite side of fulcrum 44, i.e. at the free end of arm 45b, with reversal of the shutter assembly 221–225 and suitable foreshortening of arm 45b to keep the link 46 in line with the rod 217.

The use of substantially identical shutter assemblies in main valve 100 and pilot valve 200 is advantageous from a manufacturing viewpoint and also insures high-precision operation of both valves.

Figure 6:
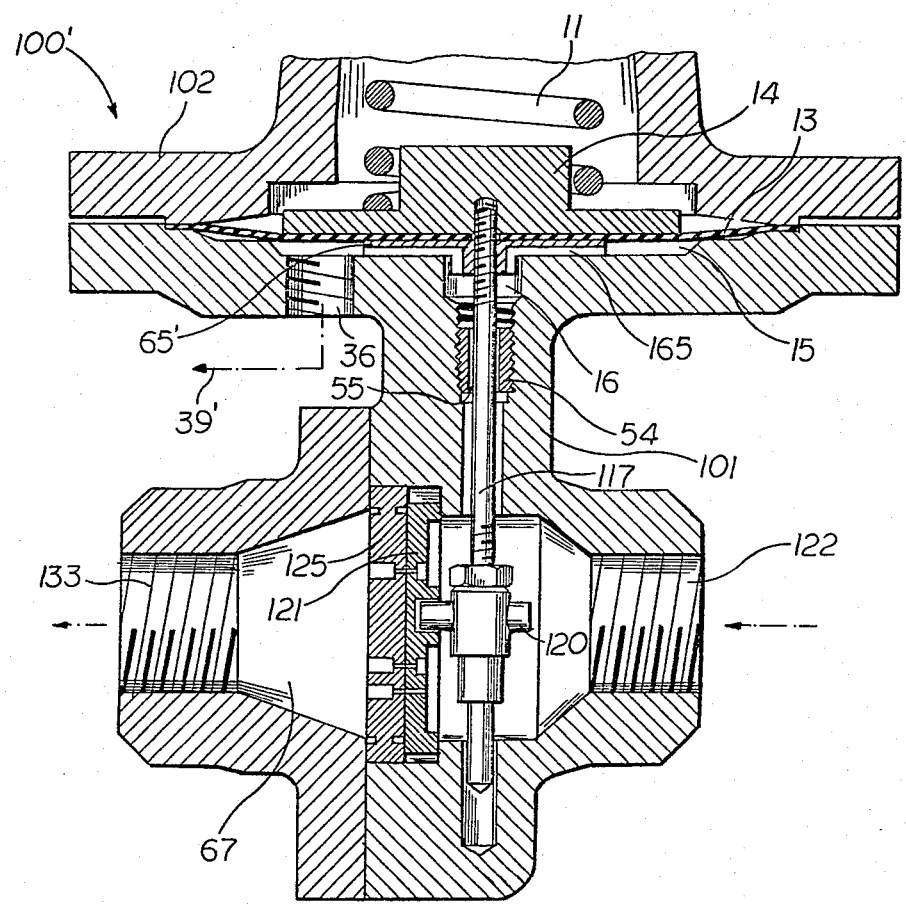
FIG. 6 is another view similar to that of FIG. 2, showing a further modification.

In FIG. 6 I have shown a valve 100' whose structure is an inversion of that of FIG. 2, with fluid under pressure entering at port 122 and leaving at port 133 in the illustrated shutter position in which the valve is open. Control port 36 now constitutes an outlet, rather than an inlet as in FIGS. 1–4, and is connected to a line 39' leading to a nonillustrated ancillary valve which could be controlled by a float, by a solenoid or in some other manner. A disk 65' underlying the membrane 13 in this instance has several bottom grooves 165 maintaining compartment 15 in communication with bore 16 even with that disk resting on the floor of that compartment, as shown. With port 36 open to the atmosphere, or to some other region of relatively low pressure, a small part of the fluid entering channel 67 via port 122 passes through compartment 15 to port 36 via the restricted clearance 55 without raising the membrane 13 from its seat. When, however, the outflow of port 36 is cut off or severely throttled by the ancillary valve in line 39', the pressure differential existing across shutter assembly 121–125 begins to repress the membrane against the biasing force of spring 11, thereby moving the slide 121 toward its blocking position with resulting progressive increase in that pressure differential until the valve 100' is completely closed. When compartment 15 is again vented to low pressure, the illustrated unblocking position is restored.

The ancillary valve in line 39' may be of the pressure-sensitive type with a control inlet connected to exit port 133, for example, in order to close the valve 100' when its outlet pressure becomes excessive; such an ancillary valve could be similar to the valve 100 of FIG. 2, for example, except that its shutter assembly would be in its unblocking position (corresponding to that of assembly 121–125 in FIG. 6) when the pressure at its control inlet is low. The combination of valve 100' with such an ancillary valve would therefore operate as a fluid-pressure regulator.

The provision of a calibrated bushing 54 in the bore 16 of valve body 101 is advantageous since it enables a possible replacement in the event of wear or if its internal diameter has to be changed for any reason. In principle, however, the restricted passage 55 around rod 117 could also be produced by machining an integral part of that body.

I claim:

1. A flow-regulating valve comprising:
   a valve body provided with an entrance port, an exit port, and a control port connectable to a source of pressure fluid, said entrance and exit ports being interconnected by a channel;
   flow-control means in said channel movable between a blocking position and an unblocking position;

a resiliently biased member in said valve body bounding a pressure compartment communicating with said control port, said member being repressible against the biasing force thereof by a pressure fluid admitted through said control port into said compartment, said body being further provided with a restricted passage leading from said compartment to a location in said channel lying at a downstream side of said flow-control means; and a rod connecting said member with said flow-control means for moving same from said blocking position into said unblocking position in response to the application of said pressure fluid to said control port, said rod traversing said passage with limited clearance facilitating the dislodgment of accumulating solids by movements of said rod, said passage being cut off by said member from said control port in said blocking position but communicating therewith in said unblocking position to provide a leakage path for said pressure fluid, said clearance being an annular space separating said rod from a bushing surrounding same in a part of said passage, said bushing having a calibrated inner diameter smaller than that of said passage, said rod being provided with a plug coming to rest against said bushing under said biasing force in the absence of countervailing fluid pressure applied to said control port, thereby obstructing said clearance in said blocking position.

2. A flow-regulating valve as defined in claim 1, wherein said member is a membrane separating said pressure compartment from a chamber containing a biasing spring which bears upon said membrane.

3. A flow-regulating valve as defined in claim 2 wherein said rod is provided with a longitudinal bore opening at one end into said channel on said downstream side and at the opposite end into said chamber for venting the latter to said exit port.

4. A flow-regulating valve as defined in claim 1, wherein said flow-control means comprises an apertured slide adjoining a fixed apertured plate, the apertures of said slide and said plate being mutually offset in said blocking position and aligned with each other in said unblocking position.

5. In combination, a flow-regulating valve as defined in claim 1, and an ancillary valve inserted into a bypass path between said entrance port and said control port for selectively admitting incoming fluid under pressure to said control port.

6. The combination defined in claim 5 wherein said fluid is a liquid accumulating in a pool after leaving said exit port, said ancillary valve being controlled by a float dipping into the liquid of said pool for stopping the flow of liquid through said bypass path unless the liquid in said pool drops below a predetermined level.

7. The combination defined in claim 6 wherein said float is supported on a lever swingable about a horizontal pivotal axis at a fulcrum on a housing of said ancillary valve, the latter comprising a sliding shutter coupled with said lever by means of a double-jointed link.

8. The combination defined in claim 7 wherein said link is articulated to said lever at a first joint and to said shutter at a second joint, said first joint lying close to said fulcrum, said shutter extending substantially horizontally in line with said link.

9. A system as defined in claim 8 wherein said lever is elbow-shaped with a substantially vertical arm articulated to said link and a substantially horizontal arm rigidly connected with said float.

10. A system as defined in claim 9 wherein said substantially vertical arm has a free end pivoted at said fulcrum.

11. A system as defined in claim 9 or 10, further comprising a pair of abutments on said housing bracketing said substantially vertical arm for limiting the swing of said lever and the displacement of said shutter.

12. A system as defined in claim 11 wherein said shutter comprises an apertured slide adjoining a fixed apertured plate, the apertures of said slide and said plate being mutually offset in a blocking position defined by one of said abutments and being aligned with each other in an unblocking position defined by the other of said abutments.

* * * * *